(12) United States Patent
Uenaka

(10) Patent No.: US 6,449,432 B1
(45) Date of Patent: Sep. 10, 2002

(54) DEVICE FOR CORRECTING A TREMBLE OF A FOCUSED IMAGE AND A CAMERA WHICH IS PROVIDED WITH THE SAME

(75) Inventor: Yukio Uenaka, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 43 days.

(21) Appl. No.: 09/609,114

(22) Filed: Jun. 30, 2000

(30) Foreign Application Priority Data

Jun. 30, 1999 (JP) .......................................... 11-185355

(51) Int. Cl.[7] .............................................. G02B 27/64
(52) U.S. Cl. ........................ 396/52; 396/55; 359/554; 348/208
(58) Field of Search .............................. 396/52, 53, 54, 396/55; 359/554–557; 348/208

(56) References Cited

U.S. PATENT DOCUMENTS 5,583,597 A 12/1996 Enomoto
5,589,904 A * 12/1996 Urata et al. .................... 396/55

FOREIGN PATENT DOCUMENTS

| JP | 5-142615 | 6/1993 |
| JP | 7-7177 | 1/1995 |
| JP | 8-82823 | 3/1996 |

\* cited by examiner

Primary Examiner—Russell Adams
Assistant Examiner—Arthur Smith
(74) Attorney, Agent, or Firm—Greenblum & Bernstein, P.L.C.

(57) ABSTRACT

A capacitor is connected to an angular speed sensor through a first switch. A first resistance is connected to the sensor through a second switch and a second resistance is connected to the sensor through a third switch. The first switch; the first resistance and the second switch; and the second resistance and the third switch are connected in parallel. The capacitor is also connected to a non-inversion-input-terminal of a buffer amplifier. An output-terminal of the buffer amplifier is connected to a non-inversion-input-terminal of a difference amplifier. The sensor is connected to an inversion-input-terminal of the difference amplifier. An output-terminal of the difference amplifier is connected to an A/D conversion port of a CPU of a camera. Immediately after an electric power is supplied to the camera, the first switch is closed, and the second and third switches are opened.

10 Claims, 6 Drawing Sheets

DEVICE FOR CORRECTING A TREMBLE OF A FOCUSED IMAGE AND A CAMERA WHICH IS PROVIDED WITH THE SAME

BACKGROUND OF INVENTION

1. Field of the Invention

This invention relates to a device for correcting a tremble of a focused image of an object caused by an oscillation of an optical device due to, for example, a hand tremble.

2. Description of the Related Art

Usually, a device for correcting a tremble of a focused image is mounted in an optical device, for example a camera. The correcting device is provided with angular speed sensors, which are used for detecting the tremble of an optical device. In the correcting device, an amount of the tremble is calculated, by integrating output signals output from the angular speed sensors. The correcting device is provided with a correction optical system which is included in a photographing optical system of the camera. The correction optical system is driven based on the result of calculation of the amount of the tremble, so that a movement of the focused image which is imaged on an imaging plane, for example, a film plane and an imaging plane of a photoelectric conversion element, can be corrected.

A gyro sensor is used as the angular speed sensors. An output signal of the gyro sensor is subjected to predetermined operations of electric circuits which are provided in the gyro sensor. Accordingly, there is a possibility that a null voltage is output from the gyro sensor, when the gyro sensor stands still. Namely, even if the tremble does not occur, output signal of the angular speed sensor does not reach "0".

As described above, direct-current-component, for example, the null voltage and so on, is included in the output signal of the angular speed sensor. The angular speed due to the hand tremble is affected by the direct-current-component to no small extent. The direct-current-component is changed by a temperature and a time passing. Accordingly, if the output signal of the angular speed sensor is directly used for calculating an amount of the tremble, it is probable that an error is included in the result of the calculation.

In order to avoid such a problem, a CR circuit of high-pass type, which comprises a capacitor and a resistance, is connected to the gyro sensor. The direct-current-component is removed from the output signal of the angular speed sensor by the CR circuit, so that an output signal corresponding to only the angular speed can be obtained. Further, the above-mentioned null voltage is also removed by the CR circuit.

In the CR circuit, a cut-off-frequency is determined by a time instant of the CR circuit. In other words, the time instant is set in accordance with the cut-off-frequency. On the other hand, it takes a predetermined time to finish removing the null voltage, in accordance with the time instant.

In the camera which is provided with the correcting device, a photographing operation is started after the removal of the null voltage is finished. Accordingly, there is a problem of missing a photographing opportunity. Further, if the photographing operation is started before the null voltage is completely removed, there is another problem that the accuracy of the tremble correction is lowered due to a remaining null voltage.

SUMMARY OF THE INVENTION

Therefore, an object of the present invention is to provide a device for correcting the focused image tremble, in which an accurate correction of the focused image tremble is able to be performed immediately after the device begins to be operated. Another object of the present invention is to provide a camera, provided with the correcting device.

In accordance with an aspect of the present invention, there is provided a device for correcting a tremble of a focused image comprising: a plurality of tremble detectors that detect a tremble of an optical axis of an optical device; a correction optical system that corrects the tremble; driving devices that drive the correction optical system; a controlling system that controls the driving devices such that the correction optical system is driven in order to cancel a focused image tremble of an object due to the tremble of the optical axis; direct-current-component removing systems that respectively output a signal obtained by removing a direct-current-component from an output signal which is output from a corresponding tremble detector of the tremble detectors; and tremble-detection initializing systems that respectively initialize the output signal of the corresponding tremble detector.

Each of the direct-current-component removing systems includes: a circuit element that has a predetermined resistance value; a capacitor; and a difference amplifier that outputs a difference between an input signal input from a first signal line that is connected to the corresponding tremble detector and an input signal input from a second signal line that is connected to the corresponding tremble detector through the circuit element and the capacitor. Each of the tremble-detection initializing systems short-circuits the circuit element and connects only the capacitor in the second signal line.

Each of the direct-current-component removing systems includes a cut-off-frequency changing system that changes a frequency of a frequency component removed from the output signal.

Each of the direct-current-component removing systems includes: a first resistance that is connectable between the corresponding tremble detector and the capacitor; and a second resistance, having a resistance value which is greater than that of the first resistance, that is connectable between the corresponding tremble detector and the capacitor. Each of the tremble-detection initializing systems includes a first switch system by which the corresponding tremble detector and the capacitor are connected in series. The cut-off-frequency changing system includes: a second switch system that connects the first resistance between the corresponding tremble detector and the capacitor; and a third switch system that connects the second resistance between the corresponding tremble detector and the capacitor.

In the second signal line, the first resistance and the capacitor are connected in series, and the second resistance and the capacitor are connected in series. Further, in the second signal line, the first switch system; the second switch system and the first resistance; and the third switch system and the second resistance are connected in parallel. When the first switch system is closed and the second switch system and the third switch system are opened, the output signal is initialized by the difference amplifier. Immediately after an electric power is supplied to the optical device, only the first switch system is closed.

In accordance with another aspect of the present invention, there is provided a device for correcting a tremble of a focused image comprising: a plurality of tremble detectors that detect a tremble of an optical axis of an optical device; a correction optical system that corrects the tremble; driving devices that drive the correction optical system; a controlling system that controls the driving devices such that the correction optical system is driven in order to cancel a focused image tremble of an object due to the tremble of the optical axis; and difference amplifiers that respectively outputs a difference between an input signal input from a first signal line that is connected to a corresponding tremble detector of the tremble detectors and an input signal input from a second signal line that is connected to the corresponding tremble detector through a circuit element and a capacitor. When the circuit element is short-circuited and the capacitor and the corresponding tremble detector are connected in series, an output signal of the corresponding tremble detector is initialized by a corresponding difference amplifier of the difference amplifiers.

In accordance with another aspect of the present invention, there is provided a camera which is provided with a device for correcting a tremble of a focused image comprising: a photographing optical system; tremble detectors that detect a tremble of an optical axis of the photographing optical system; a correction optical system that corrects the tremble of the optical axis, being provided for the tremble correcting device so as to be included in the photographing optical system; driving devices that drive the correction optical system; a photographing controlling system that controls an image capturing operation to record an image of the object; and a tremble correction controlling system that controls the driving device such that a focused image tremble of an object due to the tremble of the optical axis can be canceled; direct-current-component removing systems that respectively output a signal obtained by removing a direct-current-component from an output signal which is output from a corresponding tremble detector of the tremble detectors; and removing system controllers that respectively initialize the output signal of the corresponding tremble detector.

Each of the direct-current-component removing systems includes: a circuit element that has a predetermined resistance value; a capacitor; and a difference amplifier that outputs a difference between an input signal input from a first signal line that is connected to a corresponding tremble detector of the tremble detectors and an input signal input from a second signal line that is connected to the corresponding tremble detector through the circuit element and the capacitor. Each of the tremble-detection initializing systems short-circuits the circuit element and connects only the capacitor in the second signal line.

Each of the direct-current-component removing systems includes a cut-off-frequency changing system that changes a frequency of a frequency component removed from the output signal.

Each of the direct-current-component removing systems includes: a first resistance that is connectable between the corresponding tremble detector and the capacitor; and a second resistance, having a resistance value which is greater than that of the first resistance, that is connectable between the corresponding tremble detector and the capacitor. Each of the tremble-detection initializing systems includes a first switch system by which the corresponding tremble detector and the capacitor are connected in series. The cut-off-frequency changing system includes: a second switch system that connects the first resistance between the corresponding tremble detector and the capacitor; and a third switch system that connects the second resistance between the corresponding tremble detector and the capacitor.

In the second signal line, the first resistance and the capacitor are connected in series, the second resistance and the capacitor are connected in series. Further, in the second signal line, the first switch system; the second switch system and the first resistance; and the third switch system and the second resistance are connected in parallel. Immediately after an electric power is supplied to the camera, only the first switch system is closed; during a photometry operation, only the second switch system is closed; and while the image capturing operation is carried out, only the third switch system is closed.

BRIEF DESCRIPTION OF THE DRAWINGS

The object and other objects of the present invention will be better understood from the following description, with reference to the accompanying drawings, in which.

DESCRIPTION OF THE PREFERRED EMBODIMENTS

An embodiment according to the present invention will be explained with reference to the figures. Note that, in this specification, "a perpendicular plane" means a plane parallel to a surface of a film when a camera is held in such a manner that an optical axis of a photographing optical system is positioned horizontally. Further, "a horizontal axis" means an axis which divides the camera into two parts in the vertical direction, crossing the optical axis of the photographing optical system in the perpendicular plane, and "a vertical axis" means an axis which divides the camera into two parts in a lateral direction.

Figure 1:
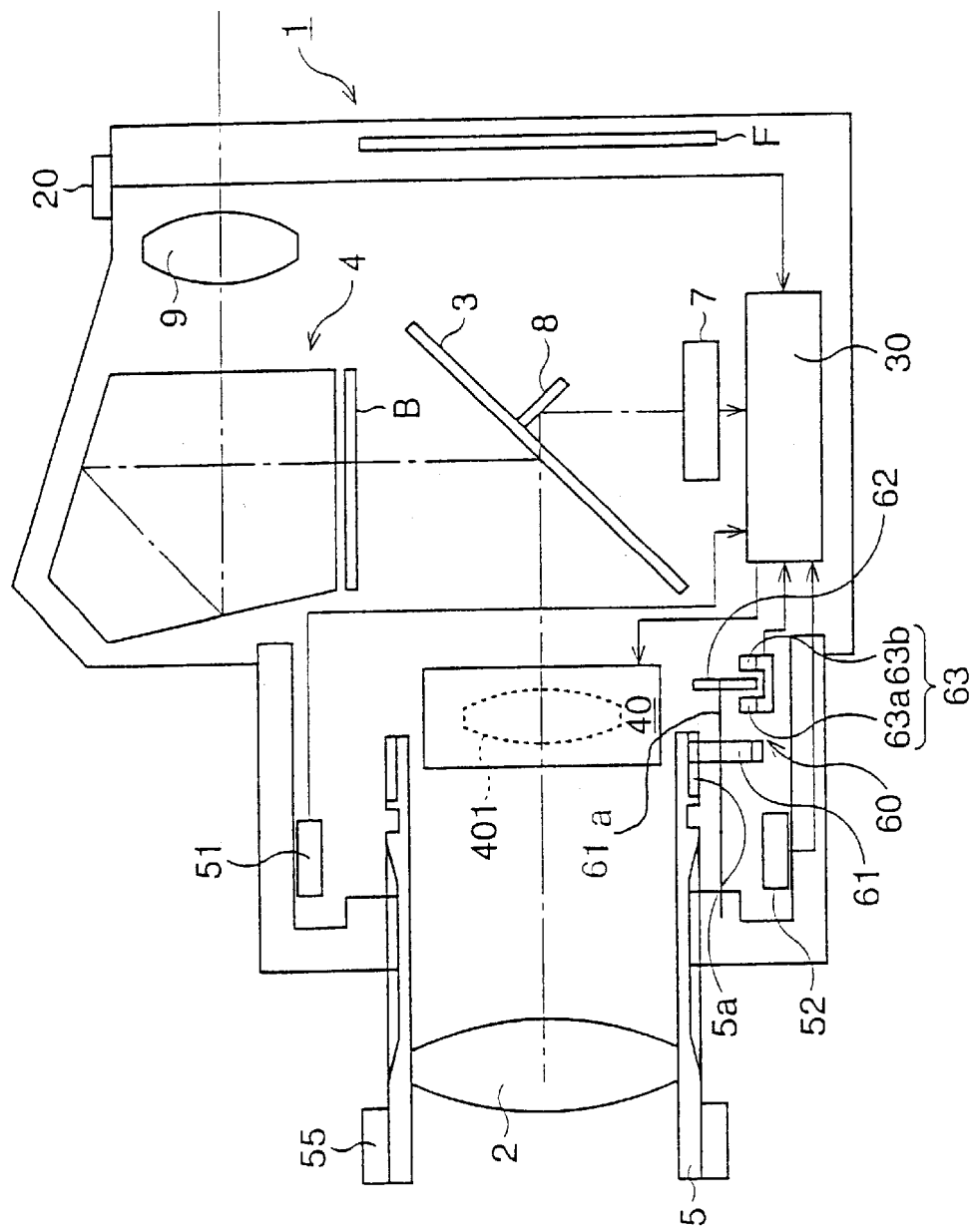
FIG. 1 is a block diagram of a camera, including a function of correcting a tremble of a focused image, to which an embodiment, according to the present invention, is applied.

FIG. 1 is shows a camera 1, including a correcting function of a focused image to which an embodiment, according to the present invention, is applied. The camera 1 is provided with an objective optical system 2, a quick return mirror 3, a finder optical system 4, an AF sensor 7, a sub-mirror 8, a shutter button 20, a controlling system 30 and a correcting system 40 of a focused image tremble. The correcting system 40 is provided with a correction lens 401 (correction optical system). A photographing optical system of the camera 1 includes the objective optical system 2 and the correction lens 401.

An object image is imaged on a surface of a film F, which is an image receiving surface, by the photographing optical system. A luminance reflected by the object is led to an eye of a user, by the finder optical system 4, after passing through the objective optical system 2 of the photographing optical system and being reflected by the quick return mirror 3. The luminance reflected by the object is also led to the AF sensor 7 after being reflected by the sub-mirror 8. The controlling system 30 wholly controls the camera 1.

Further, the camera 1 is provided with angular speed sensors 51, 52 and a lens movement detector 60. A tremble of the photographing optical system is sensed by the angular speed sensors 51 and 52. The movement of the photographing optical system along the optical axis is detected by the lens movement detector 60.

The shutter button 20 can be pushed by one step to turn a photometry switch to an ON position, and can be pushed by two steps to turn a release switch to an ON position. The information of ON/OFF position of these switches is input into the controlling system 30. Note that, the photometry switch and the release switch are omitted in FIG. 1.

The angular speed sensor 51 is provided for detecting an angular speed of the rotational movement of the camera 1 in a lengthwise direction (the vertical direction). The angular speed sensor 51 outputs a voltage corresponding to the angular speed in the lengthwise direction due to, for example, a hand tremble. The angular speed sensor 52 is provided for detecting an angular speed of the rotational movement of the camera 1 in a direction perpendicular to a sheet of FIG. 1 (horizontal direction). The angular speed sensor 52 outputs a voltage corresponding to the angular speed in the lateral direction due to, for example, the hand tremble.

The correcting system 40 for the focused image tremble is provided with the correction lens 401 which is included in the photographing optical system and a driving system to drive the correcting optical system. The correction lens 401 is provided for deflecting the optical axis of the photographing optical system. The driving system drives the correction lens 401, in accordance with a controlling signal output from the controlling system 30, so that the movement of the object image formed on the surface of the film F by the photographing optical system can be canceled. The driving system deflects the optical axis of the photographing optical system independently in the perpendicular direction to the sheet of FIG. 1 and the lengthwise direction.

When the movement of the photographing optical system is detected by the lens movement detector 60 and when the photographing is performed, the controlling system 30 corrects the focused image tremble, on the surface of the film F and in a finder view, by driving the correcting optical system 40 based on input signals from the angular speed sensors 51 and 52.

In FIG. 1, the objective optical system 2 of the photographing optical system is depicted as a single lens. However, the objective optical system 2 practically includes a plurality of lenses or lens groups. Some or all of the lenses can be moved along the optical axis of the photographing optical system, for focusing operation and zooming operation. In this embodiment, the lens movement detector 60 detects the movement of a lens group provided for the focusing operation. This lens group is referred to as a "focusing lens". Note that, the objective optical system 2 of the photographing optical system is referred to as "other optical systems" in this specification.

The quick return mirror 3 is set to a down position as shown in FIG. 1, when an object is viewed through the finder optical system 4. A luminance reflected by the object, which is incident on the camera 1 through the photographing optical system including the focusing lens and the correction system 40, is reflected by the quick return mirror 3 to be led to a focusing screen B. The object image on the focusing screen B is inverted by a pentagonal prism included in the finder optical system 4, so that the user views the object image on the focusing screen B as an erected image through an eyepiece lens 9. Namely, in this embodiment, a finder optical system in a broad sense is provided with the objective optical system 2 including the focusing lens, the correction lens 401 of the correction system 40, the quick return mirror 3, the focusing screen B, the pentagonal prism and the eyepiece lens 9.

The quick return mirror 3 and a sub-mirror 8 are set to an up position, at which the quick return mirror 3 faces to the focusing screen B, by a mirror driving device (omitted in FIG. 1), when the photographing is carried out. Accordingly, when the photographing is carried out, the luminance reflected by the object is led to the surface of the film F through the objective optical system 2 and the correction lens 401 of the focused image correcting device 40, so that the object image is imaged on the surface of the film F. The object image is recorded on the surface of the film F to be printed.

When a lens barrel 5 is rotated, the focusing lens is moved along the optical axis of the photographing optical system, by a cam mechanism (omitted in FIG. 1) which is well-known. The lens barrel 5 is rotated by a motor mounted on a body of the camera 1 or on a lens unit, or by a user s manual operation of a focusing ring 55.

An AF sensor 7 detects a defocus amount of the photographing optical system by a phase difference detecting method, which is a well-known sensor. An image sensor (omitted in FIG. 1) included in the AF sensor 7 is placed to be optically equivalent to the focusing screen B and the surface of the film F. A focusing condition on the focusing screen B is similar to a focusing condition on the surface of the film F. Accordingly, when the object image is focused on the focusing screen B by the photographing optical system, in other words, when the focal point of the photographing optical system is coincident with the focusing screen B, the object image is focused on the surface of the film F.

The AF sensor 7 detects the focusing condition of the object image on the surface of the film F as the defocus amount. Namely, the AF sensor 7 detects the defocus amount which indicates a direction and distance of a present position of the focal point of the image formed by the photographing optical system, from the focusing screen B and the surface of the film F. The controlling system 30 calculates a driving direction and a driving amount of the focusing lens based on the defocus amount detected by the AF sensor 7. The focusing lens is driven in accordance with a result of the calculation of the controlling system 30, so that an automatic focusing is performed.

The lens movement detector 60 is provided with a pinion gear 61, a slit board 62 and a photo interrupter 63. The pinion gear 61 is engaged with a rack 5a which is formed on an outer surface the lens barrel 5. A shaft 61a is fixedly engaged at a center of pinion gear 61, being perpendicular to the pinion gear 61. The slit board 62 is fixedly supported by one end of the shaft 61a. Another end of the shaft 61a is rotatably received by a hole formed on an inner wall of the body of camera 1. Namely, the slit board 62 is rotated in accordance with a rotational movement of the pinion gear 61. A plurality of slits are radially formed on the slit board 62 around a rotating axis of the slit board 62. The photo interrupter 63 includes a light emitting portion 63a and a light receiving portion 63b. The slitboard 62 is placed between the light emitting portion 63a and the light receiving portion 63b. The light receiving portion 63b outputs a signal depending upon whether light is received. Namely, the signal is periodically output from the light receiving portion 63b in accordance with a rotation of the slit board 62. As described above, the lens barrel 5 is rotated by the motor mounted on the body of the camera 1 or the lens unit in an auto focus mode, and rotated by the user's manual operation in a manual mode. Accordingly, a pulse signal is output from the light receiving portion 63b in accordance with the rotation of the slit board 62 accompanying the rotation of the lens barrel 5 in the focusing operation.

Figure 2:
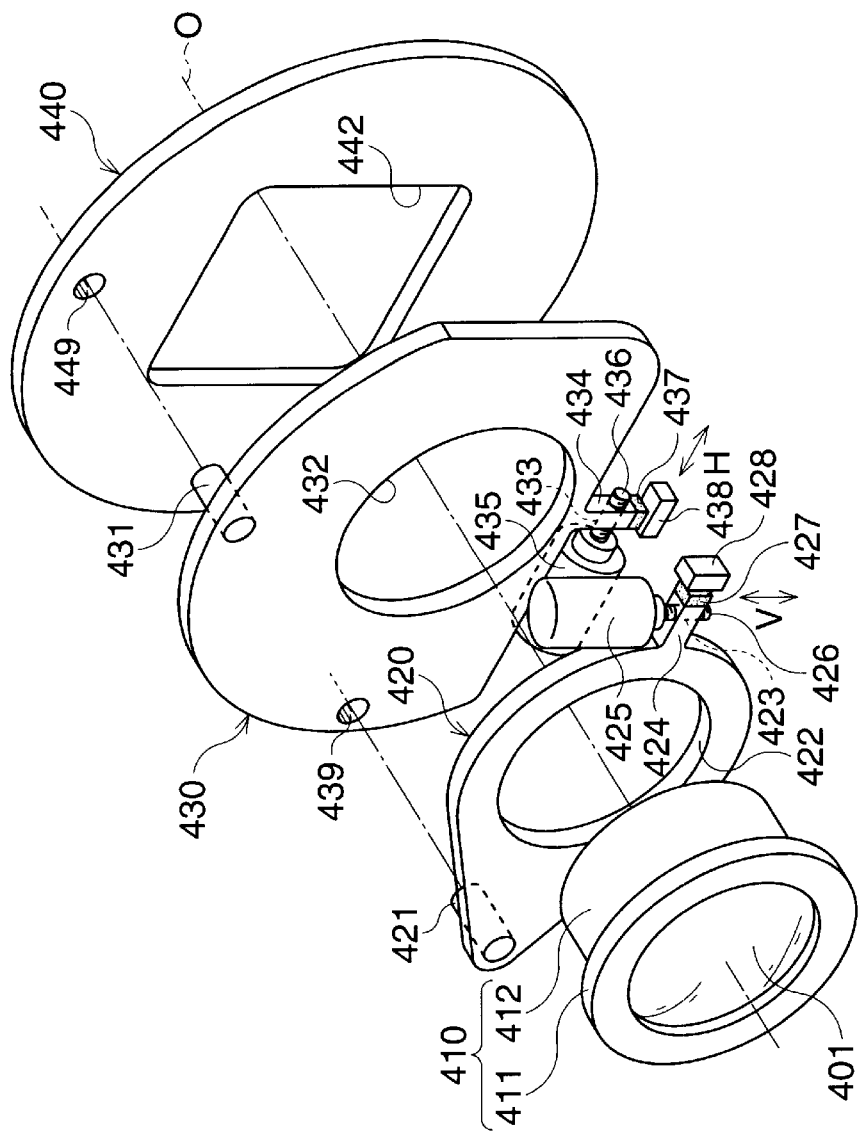
FIG. 2 is a perspective view of a driving device of a correcting optical system of the embodiment.

FIG. 2 is an exploded perspective view of the correcting system 40 of the focused image tremble. The correction lens 401, which is a part of the correcting optical system, is fixedly engaged in a lens frame 410. The lens frame 410 is fixed to a first rotating board 420. The first rotating board 420 is rotatably mounted on a second rotating board 430 by a pivot shaft 421. The second rotating board 430 is rotatably mounted on a base board 440 by a pivot shaft 431. The pivot shaft 431 is positioned, being rotated from the pivot shaft 421 by 90 degrees with an optical axis O of the above-mentioned photographing optical system being a rotational center. The base board 440 is fixedly mounted in the camera 1.

Accordingly, the correction lens 401 is held, being movable in directions H and V (indicated by arrows in FIG. 2) in a plan perpendicular to the optical axis O in accordance with the rotational movement of the first and second rotating boards 420, 430.

The lens frame 410 includes a large diameter portion 411 and a small diameter portion 412. The small diameter portion 412 is engaged with an opening portion 422 of the first rotating board 420. The pivot shaft 421 is received by a pivot hole 439 which is formed on the second rotating board 430. An arm 424 is formed at an opposite side to the pivot shaft 421 with the opening portion 422 therebetween. A screw hole 423 is formed in the arm 424.

A screw 426, which is connected to a rotational axis of a motor 425 by a flexible joint, is threadably engaged with the screw hole 423. The motor 425 is fixed on the second rotating board 430. When the motor 425 is driven, the first rotating board 420 is rotatably moved around the pivot shaft 421 in the direction V, in accordance with the rotational movement of the screw 426.

A magnet 427 is mounted on a tip end of the arm 424. An MR (Magnetic Resistance) sensor 428 is mounted on the second rotating board 430, facing towards the magnet 427. Positional data of the magnet 427 is detected by the MR sensor 428. The controlling system 30 detects the movement of the correction lens 401 in the direction V by an output signal from the MR sensor 428.

The pivot shaft 431 is received by a pivot hole 449 which is formed on the base board 440. An opening portion 432, by which the small diameter portion 412 is received, is formed on the second rotating board 430. The opening portion 432 is formed in such a manner that, the movement of the small diameter portion 412, in accordance with the rotation of the first rotating board 420, is not prevented, when the first rotating board 420 is mounted on the second rotating board 430.

A driving arm 434 is formed at an opposite side to the pivot shaft 431 with the opening portion 432 therebetween. A screw 436, which is connected to a rotational axis of a motor 435 by a flexible joint, is threadably engaged with the screw hole 433. When the motor 435 is driven, the second rotating board 430 is rotatably moved around the pivot shaft 431 in the direction H, in accordance with the rotational movement of the screw 436.

A magnet 437 is mounted on a tip end of the driving arm 434. An MR sensor 438 is mounted on the base board 440, facing towards the magnet 437. Positional data of the magnet 437 is detected by the MR sensor 438. The controlling system 30 detects the movement of the correction lens 401 in the direction H by an output signal from the MR sensor 438.

An opening portion 442, through which the small diameter portion 412 is pierced, is formed on the base board 440. The opening portion 442 is formed in such a manner that the movement of the small diameter portion 412, in accordance with the rotation of the first and second rotating boards 420, 430, is not prevented.

Figure 3:
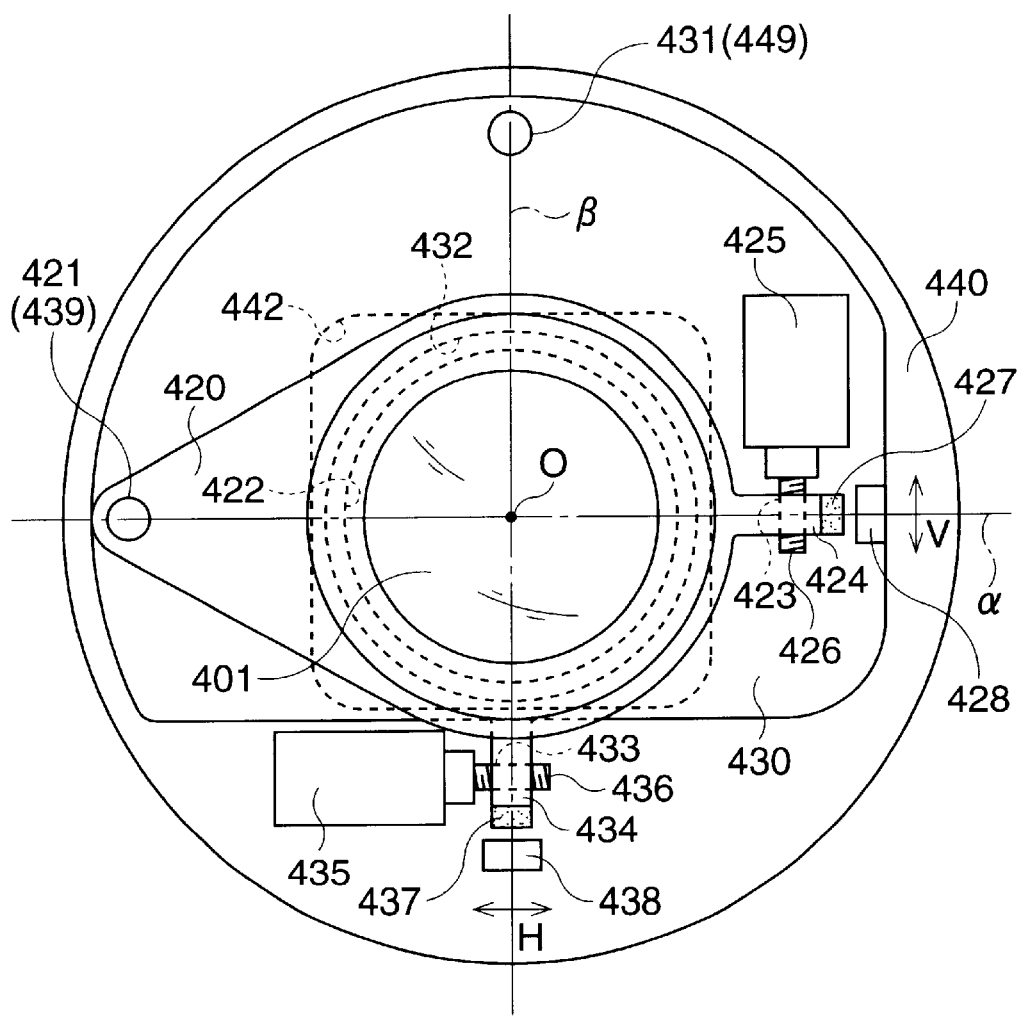
FIG. 3 is a front view of the driving device of FIG. 2, viewed from the side of an other optical system of a photographing optical system.

FIG. 3 is a front view showing the correcting system 40, in which the lens frame 410, the first rotating board 420, the second rotating board 430 and the base board 440 are constructed, depicted from the side of the objective optical system 2 of the photographing optical system. In FIG. 3, an optical axis of the correction lens 401 is coaxial with the optical axis of the objective optical system 2 (the other optical system of the photographing optical system). Namely, in FIG. 3, the optical axis of the correction lens 401 coincides with the optical axis of the objective optical system 2. This situation is referred to as a "standard situation". In the standard situation, the rotational center of the pivot shaft 421 of the first rotating board 420, the optical axis O, the magnet 427 and the MR sensor 428 are positioned on a straight line $\alpha$. Similarly, in the standard situation, the rotational center of the pivot shaft 431 of the second rotating board 430, the optical axis O, the magnet 437 and the MR sensor 438 are positioned on a straight line $\beta$.

Note that, the straight line $\beta$ corresponds to the above-mentioned horizontal axis, and the straight line $\beta$ corresponds to the above-mentioned vertical axis.

Figure 4:
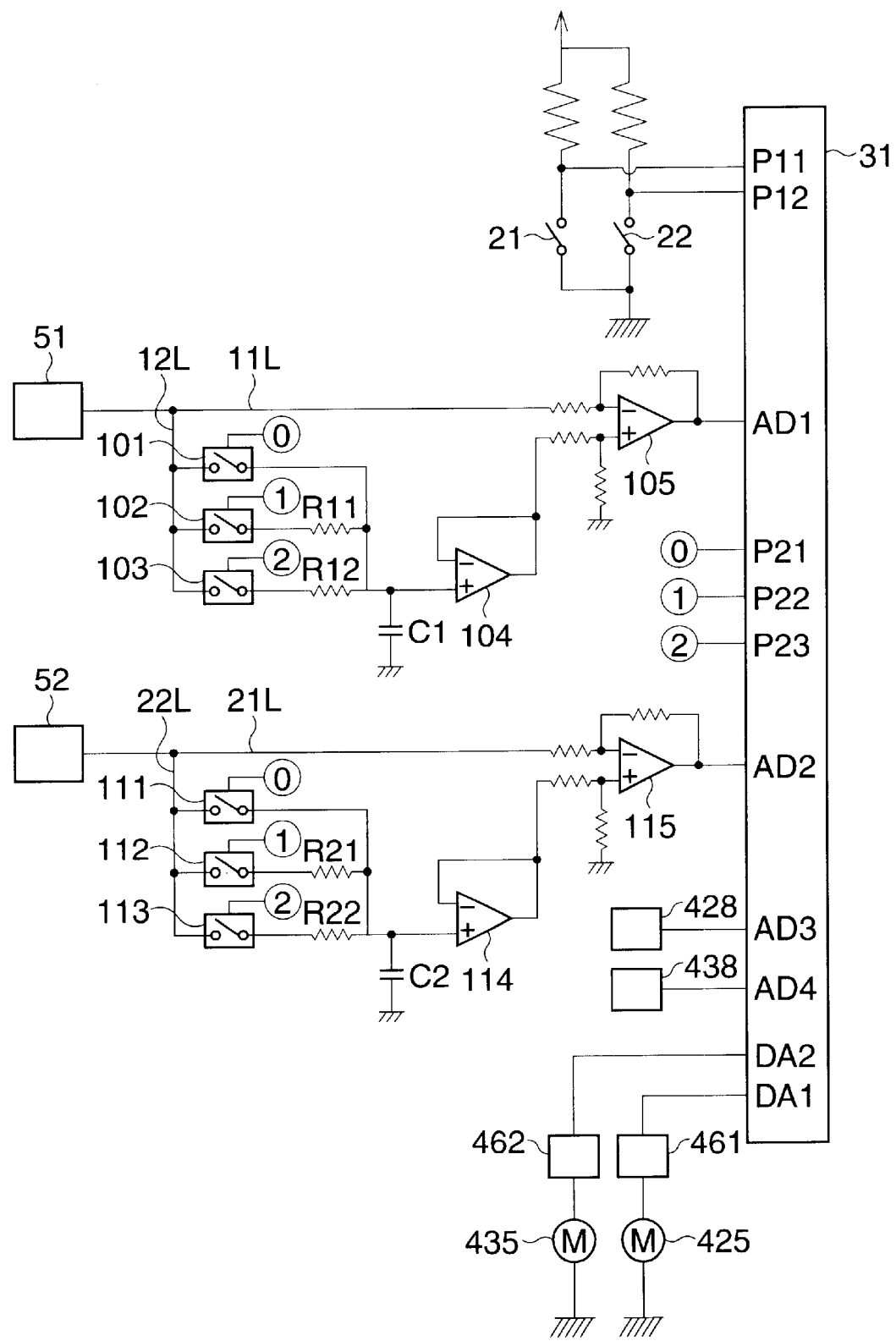
FIG. 4 is a block diagram of a controlling system of the camera of the embodiment.

FIG. 4 is a block diagram of the controlling system 30. Input and output signals of a CPU 31 which is provided for the above-mentioned controlling system 30, will be explained with reference to the block diagram. Information of the ON/OFF status of the photometry switch 21, in accordance with the operation of the shutter button 20 (see FIG. 1), is input to a port P11 of the CPU 31, as a digital pulse of one bit. Also, information of the ON/OFF status of the release switch 22, in accordance with the operation of the shutter button 20, is input to a port P12 of the CPU 31, as a digital pulse of one bit. Voltage output from the MR sensor 428 is input to an A/D conversion port AD3 of the CPU 31, and voltage output from the MR sensor 438 is input to an A/D conversion port AD4 of the CPU 31.

A motor 425, which drives the first rotating board 420, is connected to a D/A output port DA1 through a motor driving circuit 461, and a motor 435, which drives the second rotating board 430, is connected to a D/A output port DA2 through a motor driving circuit 462. In the CPU 31, moving amounts of the correction lens 401 in the directions H and V, by which the focused image tremble is corrected, are calculated based on the above mentioned input signals, and the moving amounts of the correction lens 401 are respectively converted to the driving amounts of the motors 425 and 435. Then, voltage corresponding to the driving amounts of the motors 435 and 425 is respectively output from the D/A ports DA1 and DA2.

An output signal from the angular speed sensor 51 is led to a signal line 11L (first signal line) and a signal line 12L (second signal line). The angular speed sensor 51 is connected to an inversion-input terminal of a difference amplifier 105 through a resistance, by the signal line 11L. An output terminal of the difference amplifier 105 is connected to the inversion-input terminal, to compose a negative-feedback amplifier. Further, the output terminal of the difference amplifier 105 is connected to an A/D conversion port AD1 of the CPU 31.

In the signal line 12L, a capacitor C1, which is grounded, is connected to the angular speed sensor 51 in series through an analog switch 101 (first switch system). A resistance R11 (first resistance) is connected to the angular speed sensor 51 in series through an analog switch 102 (second switch system). Also, a resistance R12 (second resistance) is connected to the angular speed sensor 51 in series through an analog switch 103 (third switch system). The analog switch 101; the analog switch 102 and the resistance R11; and the analog switch 103 and the resistance R12 are connected in parallel. The analog switch 101 is connected to a port P21, the analog switch 102 is connected to a port P22, and the analog switch 103 is connected to a port P23. Namely, ON/OFF of each analog switch is controlled by controlling signals output from the CPU 31.

The capacitor C1 is also connected to a non-inversion-input terminal (+) of a buffer amplifier 104. An output terminal of the buffer amplifier 104 is connected to a non-inversion-input terminal of a difference amplifier 105.

Circuits similar to the circuits connected to the angular speed sensor 51 are connected to the angular speed sensor 52. An output signal from the angular speed sensor 52 is led to a signal line 21L (first signal line) and a signal line 22L (second signal line). The angular speed sensor 52 is connected to an inversion-input terminal of a difference amplifier 115, by the signal line 21L. In signal line 22L, analog switches 111, 112 and 113, which are connected in parallel, are connected to the angular speed sensor 52. The analog switch 111 is directly connected to a capacitor C2. The analog switches 112 and 113 are respectively connected to the capacitor C2 through resistances R21 and R22. The capacitor C2 is connected to a non-inversion-input terminal of a buffer amplifier 114. An output terminal of the buffer amplifier 114 is connected to a non-inversion-input terminal of the difference amplifier 115 through a resistance. An output terminal of the difference amplifier 115 is connected to an A/D conversion port AD2.

As described above, in the difference amplifier 105, a difference, between a signal which is output from the angular speed sensor 51 and input to the inversion-input terminal, and a signal which is output from the angular speed sensor 51 and input to the non-inversion-input terminal through the capacitor C1, the resistance R11 and resistance R12, which are connectable to the signal line 12L, is calculated and amplified.

Similarly, in the difference amplifier 115, a difference, between a signal which is output from the angular speed sensor 52 and input to the inversion-input terminal, and a signal which is output from the angular speed sensor 52 and input to the non-inversion-input terminal through the capacitor C2, the resistance R21 and resistance R22, which are connectable to the signal line 22L, is calculated and amplified.

In the CPU 31, an exposure value (Ev) is calculated by performing a photometry operation of a luminance reflected by the object through a photometry mechanism (omitted in FIG. 4), when the ON signal is input to the first input port P11 after the photometry switch 21 is turned to the ON position by pushing the shutter button 20 by one step. Then, an aperture value (Av) and an exposure time (Tv) are calculated based on the Ev, in the CPU 31.

Further, under the control of the CPU 31, an aperture device (omitted in FIG. 4) is adjusted based on the Av, the quick return mirror 3 (see FIG. 1) is set to an up position, and then a shutter device (omitted in FIG. 4) is driven at a predetermined speed, when the ON signal is input to the second input port P12 after the release switch 22 is turned to the ON position by pushing the shutter button 20 by two steps.

Figure 5:
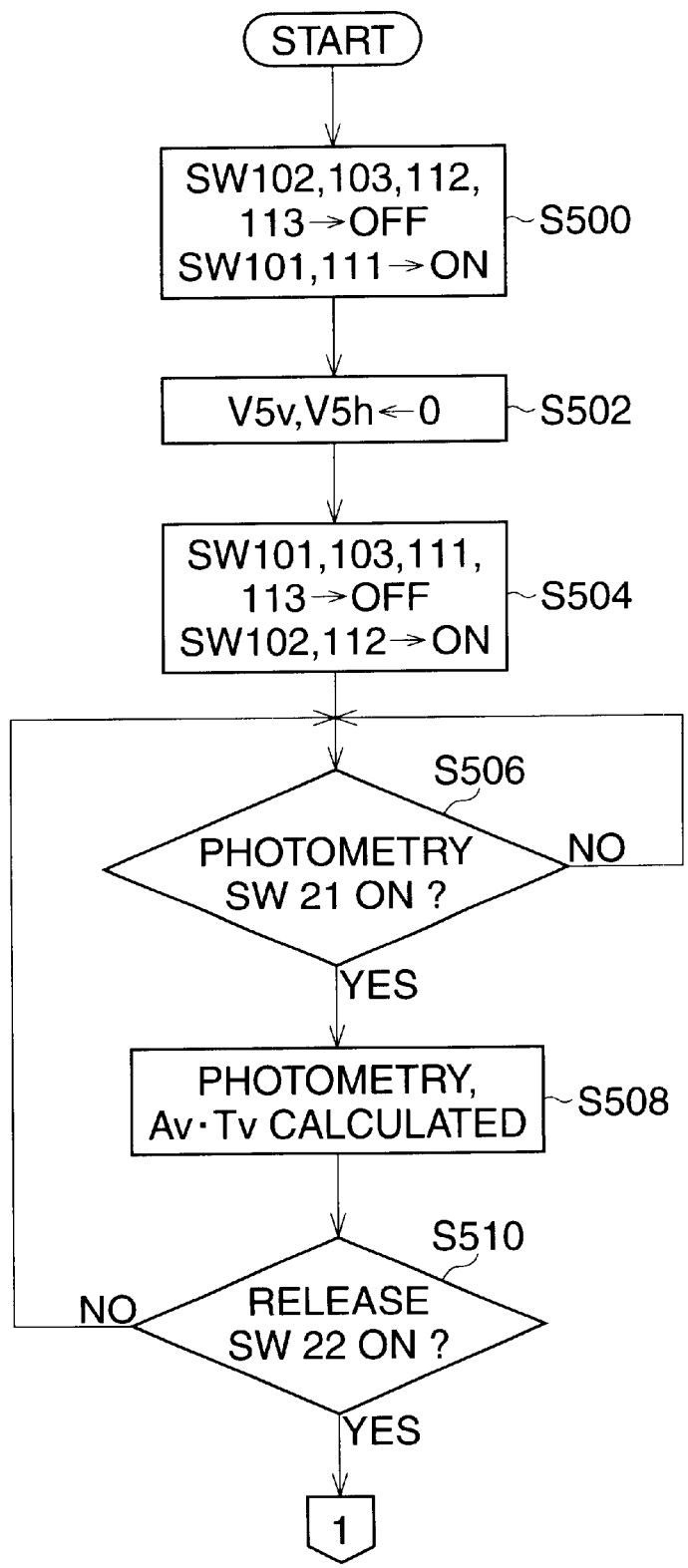
FIG. 5 is a first half of a flowchart indicating procedures of a camera controlling sequence of the embodiment.
Figure 6:
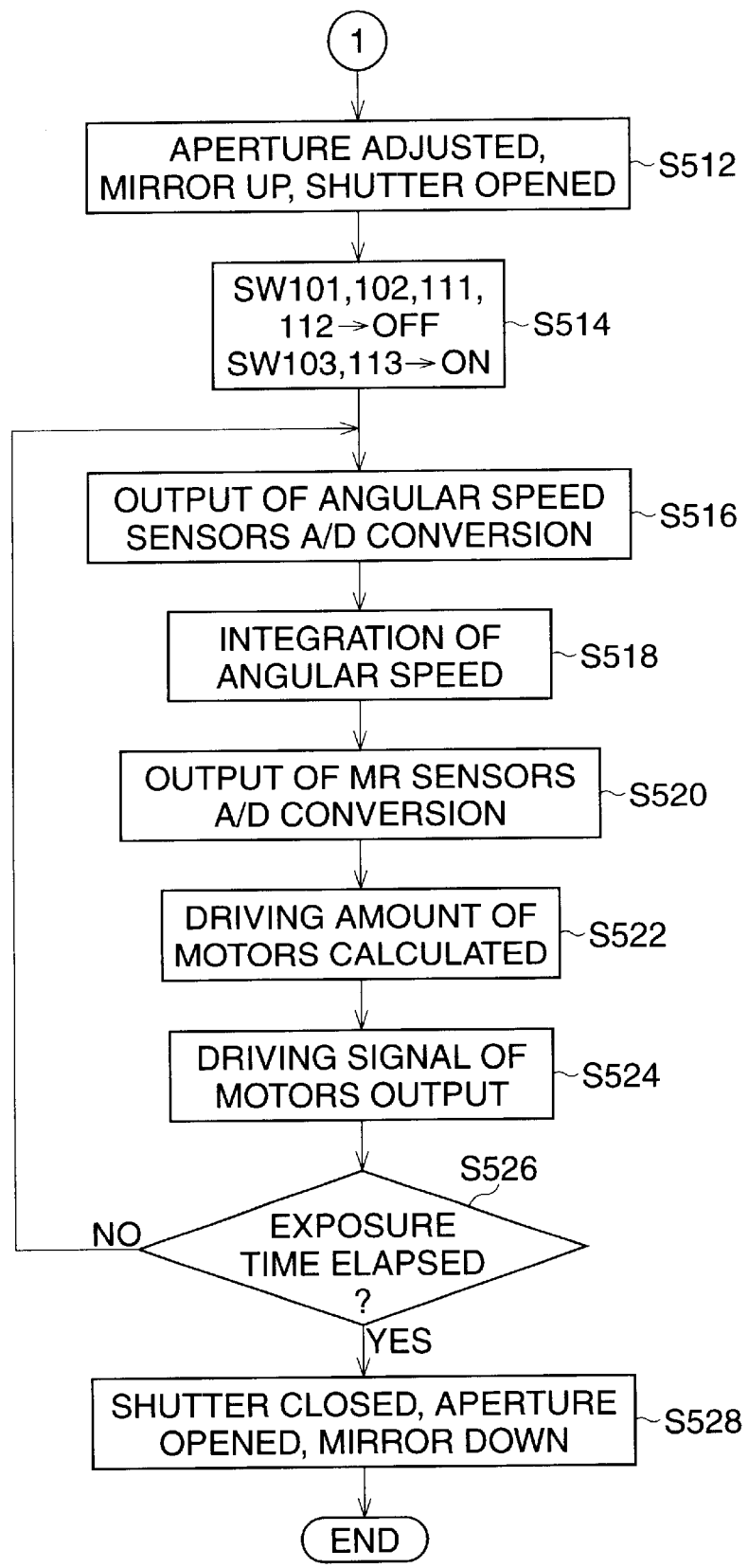
FIG. 6 is a latter half of the flowchart indicating procedures of the camera controlling sequence of the embodiment.

FIG. 5 is a flowchart indicating procedures of the tremble correcting operation of the focused image, performed in the camera 1. When an electric power is supplied to the camera 1, the performance is started. At step S500, a control signal of switch ON is output from the port P21 of the CPU 31 and a control signal of switch OFF is output from the ports P22 and P23. Namely, the switches 101 and 111 are closed (i.e. switched ON state), and the switches 102, 103, 112 and 113 are opened (i.e. switched OFF state).

Accordingly, an output voltage V1v of the angular speed sensor 51 is charged in the capacitor C1, and a value of an output voltage V2v of the buffer amplifier 104 coincides with the value of the output voltage V1v. Therefore, input voltages of the inversion-input terminal and the non-inversion-input terminal of the difference amplifier 105 are the output voltage V1v of the angular speed sensor 51, so that an output voltage V3v of the difference amplifier 105 becomes "0".

Similarly, an output voltage V1h of the angular speed sensor 52 is charged in the capacitor C2, and a value of an output voltage V2h of the buffer amplifier 114 coincides with the value of the output voltage V1h. Therefore, input voltages of the inversion-input terminal and the non-inversion-input terminal of the difference amplifier 115 are the output voltage V1h of the angular speed sensor 52, so that an output voltage V3h of the difference amplifier 115 becomes "0".

As described above, the value of input voltages input to the A/D conversion input terminals AD1 and AD2 becomes "0" by the ON/OFF control at step S500. In other words, immediately after the electric power is supplied to the camera 1, an effect can be obtained, which is equal to an effect that a null voltage included in the output voltages of the angular speed sensors is removed. Accordingly, the tremble correcting operation is started in a state that the optical axis of the correction lens 402 is coaxial with the optical axis of the other optical system of the photographing optical system, so that the tremble correcting operation is accurately performed.

At step S502, a digital-rotational-displacement-value V5v along the vertical axis and a digital-rotational-displacement-value V5h along the horizontal axis are set to "0", being initialized. Note that the values V5v and V5h will be explained below.

At step S504, the control signal of switch ON is output from the port P22, and the control signal of switch OFF is output from the ports P21 and P23. Namely, the switches 102 and 112 are closed, and the switches 101, 103, 111 and 113 are opened, so that a CR direct-current-component cut circuit (integrating circuit) is made by the resistance R11 and the capacitor C1, and a CR direct-current-component cut circuit (integrating circuit) is made by the resistance R21 and the capacitor C2. Resistance values of the resistances R11 and R21 are set smaller than resistance values of the resistances R12 and R22. Accordingly, a time constant determined by the resistance R11 and the capacitor C1 and a time constant determined by the resistance R21 and the capacitor C2 are relatively small.

Therefore, a cut-off-frequency, which is removed by the CR direct-current-component cut circuit made by the resistance R11 and the capacitor C1, is set relatively high. Similarly, a cut-off-frequency, which is removed by the CR direct-current-component cut circuit made by the resistance R21 and the capacitor C2, is set relatively high. For example, the output voltages of the angular speed sensors 51 and 52 respectively include a large direct-current-component, when a pan operation is performed in order to settle on a composition before the photographing operation is started by pushing the shutter button 20 by two steps. Under such a situation, the large direct-current-component is quickly removed by the above-mentioned CR direct-current-component cut circuits.

The output voltage V3$v$, in which the relatively high frequency component is removed from the output voltage V1$v$ of the angular speed sensor 51, is output from the difference amplifier 105 and input to the A/D conversion port AD1. Similarly, the output voltage V3$h$, in which the relatively high frequency component is removed from the output voltage V1$h$ of the angular speed sensor 52, is output from the difference amplifier 115 and input to the A/D conversion port AD2.

Then, at step S506, it is checked whether the photometry switch is ON. If the photometry switch is ON, the process goes to step S508. At step S508, the photometry operation is performed, and the aperture value and the exposure time and so on are calculated.

Subsequently, at step S510, it is checked whether the release switch 22 is ON. If the release switch is OFF, the process returns to step S506, and if the release switch is ON, the process goes to step S512. Namely, until the release switch is turned to the ON position, the procedures from step S506 through step S510 are repeatedly performed.

When the release switch is turned to the ON position by pushing the shutter button 20 by two steps, and the ON signal is input to the input port P12, the process goes to step S512. At step S512, the aperture device is adjusted, the quick return mirror 3 is set to the up position, and the shutter device is driven at a predetermined speed.

At step S514, the control signal of switch ON is output from the port P23, and the control signal of switch OFF is output from the ports P21 and P22. Accordingly, the switches 103 and 113 are closed, and the switches 101, 102, 111 and 112 are opened, so that a CR direct-current-component cut circuit is made by the resistance R12 and the capacitor C1, and a CR direct-current-component cut circuit is made by the resistance R22 and the capacitor C2.

As described above, the resistance values of the resistances R12 and R22 are respectively greater than the resistance values of the resistances R11 and R21. Accordingly, a time constant determined by the resistance R12 and the capacitor C1 is greater than the time constant determined by the resistance R11 and the capacitor C1, and a time constant determined by the resistance R22 and the capacitor C2 is greater than the time constant determined by the resistance R21 and the capacitor C2.

Namely, a cut-off-frequency, which is removed by the CR circuit made by the resistance R12 and the capacitor C1, is lower than the cut-off-frequency, which is removed by the CR circuit made by the resistance R11 and the capacitor C1. Similarly, a cut-off-frequency, which is removed by the CR circuit made by the resistance R22 and the capacitor C2, is lower than the cut-off-frequency, which is removed by the CR circuit made by the resistance R21 and the capacitor C2.

For example, as a camera position is almost still during an exposure period, the output voltages of the angular speed sensors 51 and 52 include a relatively low frequency component. Under such a situation, the relatively low frequency component is not removed by the CR circuit made by the resistance R12 and the capacitor C1 and the CR circuit made by the resistance R22 and the capacitor C2. Accordingly, the relatively low frequency component is not removed, being treated as the hand tremble in the tremble correction. Therefore, the tremble correction is carried out more accurately.

The output voltage V3$v$, in which the relatively low frequency component is removed from the output voltage V1$v$ of the angular speed sensor 51, is output from the difference amplifier 105 and input to the A/D conversion port AD1. Similarly, the output voltage V3$h$, in which the relatively low frequency component is removed from the output voltage V1$h$ of the angular speed sensor 52, is output from the difference amplifier 115 and input to the A/D conversion port AD2.

At step S516, the angular speed V3$v$, input to the port AD1, is converted to a digital value to be set to a digital-detected-variable V4$v$ along the vertical axis, and the angular speed V3$h$, input to the port AD2, is converted to a digital value to be set to a digital-detected-variable V4$h$ along the horizontal axis.

Subsequently, at step S518, a digital-rotational-displacement-value V5$v$, which defines a rotational displacement of the first rotating board 420 along the vertical axis $\beta$, is calculated by integrating the digital-detected-variable V4$v$. Also, a digital-rotational-displacement-value V5$h$, which defines the rotational displacement of the second rotating board 430 along the horizontal axis a, is calculated by integrating the digital-detected-vertical V4$h$.

At step S520, an analog signal detected by the MR sensor 428 is read from the A/D conversion port AD3. The analog signal detected by the MR sensor 428 corresponds to a present position of the first rotating board 420. The analog signal of the MR sensor 428 is converted to a digital value, before being stored in a digital-present-position-value V6$v$ along the vertical axis. The value V6$v$ corresponds to a present position of the correction lens 401 along the direction V (see FIGS. 2 and 3). Also, an analog signal detected by the MR sensor 438 is read from the A/D conversion port AD4. The analog signal detected by the MR sensor 438 corresponds to a present position of the second rotating board 430. The analog signal of the MR sensor 438 is converted to a digital value, before being stored in a digital-present-position-value V6$h$ along the horizontal axis. The value V6$h$ corresponds to a present position of the correction lens 401 along the direction H (see FIGS. 2 and 3).

At step S522, a digital-rotational-driving-value V7$v$ along the vertical axis is calculated by subtracting the digital-present-position-value V6$v$ along the vertical axis from the digital-rotational-displacement-value V5$v$. The V7$v$ is a driving value of the first rotating board 420 from the present position along the vertical axis. Namely, the V7$v$ corresponds to a driving amount of the motor 425. Also, a digital-rotational-driving-value V7$h$ along the horizontal axis is calculated by subtracting the digital-present-position-value V6$h$ along the horizontal axis from the digital-rotational-displacement-value V5$h$. The V7$h$ is a driving value of the second rotating board 430 from the present position along the horizontal axis. Namely, the V7$h$ corresponds to a driving amount of the motor 435.

Subsequently, at step S524, the digital-rotational-driving-value V7$v$ along the vertical axis is converted to an analog driving signal, before outputting the analog driving signal from the first D/A conversion port DA1. Also, the digital-rotational-driving-value V7$h$ along the horizontal axis is converted to an analog driving signal, before outputting the analog driving signal from the second D/A conversion port DA2.

The analog driving signal (corresponding to the V7v), output from the first D/A conversion port DA1, is output to the motor 425, after being amplified by the motor driving circuit 461. The motor 425 drives the first rotating board 420 based on the analog driving signal. Accordingly, the correction lens 401 is driven along the vertical axis β so that the vertical axis component of the focused image tremble due to the hand tremble can be canceled.

The analog driving signal (corresponding to the V7h), output from the second D/A conversion port DA2, is output to the motor 435, after being amplified by the motor driving circuit 462. The motor 435 drives the second rotating board 430 based on the analog driving signal. Accordingly, the correction lens 401 is driven along the horizontal axis a so that the horizontal axis component of the focused image tremble due to the hand tremble can be canceled.

At step S526, it is checked whether the exposure time, which was calculated at step S508, has elapsed. If the exposure time has not elapsed, the process returns to step S516, the procedures from step S516 through step S524 are repeated, so that the above-mentioned driving controls of the motors 425 and 435 are carried out. On the other hand, if it is confirmed that the exposure time has elapsed, the process goes to step S528. At step S528, the shutter device is closed, the quick return mirror is reset to the down position, and the aperture device is driven to the fully open position, then the photographing operation is ended.

As described above, according to this embodiment, immediately after the electric power is supplied to the camera 1, the resistance of each of the CR direct-current-component cut circuits is short-circuited, and the output voltages of the angular speed sensors are charged in the capacitors C1 and C2. Accordingly, in the difference amplifiers for removing the direct-current-component included in the output voltages of the angular speed sensors, the inversion-input-terminal connected to the angular speed and the non-inversion-input-terminal connected to the capacitor are equipotential, so that the output of the difference amplifiers is initialized. Namely, the effect can be obtained, which is equal to the effect that the null voltage is removed from the output of the angular speed sensors in an instant. Accordingly, immediately after the electric power is supplied to the camera 1, the photographing operation can be started with the focused image tremble correction which has a high accuracy.

As described above, according to the present invention, in a device for correcting the focused image tremble, the tremble correction having a high accuracy is started immediately after the operation of the device is started.

The present disclosure relates to subject matter contained in Japanese Patent Application No. P11-185355 (filed on Jun. 30, 1999) which is expressly incorporated herein, by reference, in its entirety.

What is claimed is:

1. A device for correcting a tremble of a focused image comprising:
    a plurality of tremble detectors that detect a tremble of an optical axis of an optical device;
    a correction optical system that corrects the tremble;
    a plurality of driving devices that drive said correction optical system;
    a controlling system that controls said driving devices such that said correction optical system is driven in order to cancel a focused image tremble of an object due to the tremble of said optical axis;
    a plurality of direct-current-component removing systems, corresponding to said plurality of tremble detectors, that respectively remove direct-current-components from output signals of said corresponding tremble detectors, each direct-current-component removing system comprising a circuit element having a predetermined resistance value, a capacitor, and a difference amplifier that outputs a difference between a first input signal, input from a first signal line connected to said corresponding tremble detector, and a second input signal input from a second signal line connected to said corresponding tremble detector through said circuit element and said capacitor; and
    a plurality of tremble-detection initializing systems, corresponding to said plurality of tremble detectors and said plurality of direct-current-component removing systems, that respectively initialize said output signals of said corresponding tremble detectors, wherein each tremble-detection initializing system short-circuits said circuit element of said corresponding direct-current-component removing system and connects only said capacitor in said second signal line of said corresponding direct-current-component removing system.

2. The device of claim 1, wherein each of said direct-current-component removing systems further comprises a cut-off frequency changing system that changes a frequency of a frequency component removed from the output signal.

3. The device of claim 2, wherein each of said direct-current-component removing systems includes:
    a first resistance that is connectable between said corresponding tremble detector and said capacitor; and
    a second resistance, having a resistance value which is greater than that of said first resistance, that is connectable between said corresponding tremble detector and said capacitor;
    wherein each of said tremble-detection initializing systems includes a first switch system by which said corresponding tremble detector and said capacitor are connected in series; and
    wherein said cut-off-frequency changing system includes:
        a second switch system that connects said first resistance between said corresponding tremble detector and said capacitor; and
        a third switch system that connects said second resistance between said corresponding tremble detector and said capacitor.

4. The device of claim 3, wherein in said second signal line, said first resistance and said capacitor are connected in series;
    said second resistance and said capacitor are connected in series;
    said first switch system, said second switch system and said first resistance, and said third switch system and said second resistance are connected in parallel; and
    wherein when said first switch system is closed and said second switch system and said third switch system are opened, said output signal is initialized by said difference amplifier.

5. The device of claim 4, wherein immediately after an electric power is supplied to said optical device, only said first switch system is closed.

6. A device for correcting a tremble of a focused image comprising:
    a plurality of tremble detectors that detect a tremble of an optical axis of an optical device;
    a correction optical system that corrects said tremble;
    driving devices that drive said correction optical system;

a controlling system that controls said driving devices such that said correction optical system is driven in order to cancel a focused image tremble of an object due to said tremble of said optical axis; and difference amplifiers that respectively output a difference between an input signal input from a first signal line that is connected to a corresponding tremble detector of said tremble detectors and an input signal input from a second signal line that is connected to said corresponding tremble detector through a circuit element and a capacitor; and wherein when said circuit element is short-circuited and said capacitor and said corresponding tremble detector are connected in series, an output signal of said corresponding tremble detector is initialized by a corresponding difference amplifier of said difference amplifiers.

7. A camera which is provided with a device for correcting a tremble of a focused image of an object comprising:

a photographing optical system;

tremble detectors that detect a tremble of an optical axis of said photographing optical system;

a correction optical system that corrects the tremble of said optical axis, being provided for said tremble correcting device so as to be included in said photographing optical system;

driving devices that drive said correction optical system;

a photographing controlling system that controls an image capturing operation to record an image of the object;

a tremble correction controlling system that controls said driving devices to enable cancellation of a focused image tremble of the object due to the tremble of the optical axis;

direct-current-component removing systems that respectively output signals obtained by removing direct-current-components from output signals of corresponding tremble detectors, each of said direct-current-component removing systems comprising a circuit element having a predetermined resistance value, a capacitor, and a difference amplifier that outputs a difference between a first input signal, input from a first signal line connected to a corresponding tremble detector, and a second input signal, input from a second signal line connected to said corresponding tremble detector through said circuit element and said capacitor; and removing system controllers that respectively initialize said output signals of corresponding tremble detectors, each of said removing system controllers short-circuiting said circuit element and connecting said capacitor in said second signal line of said corresponding direct-component-removing system.

8. The device of claim 7, wherein each of said direct-current-component removing systems further comprises a cut-off frequency changing system that changes a frequency of a frequency component removed from the output signal.

9. The camera of claim 8, wherein each of said direct-current-component removing systems further comprises:

a first resistance, having a first resistance value, that is connectable between said corresponding tremble detector and said capacitor; and a second resistance, having a second resistance value greater than the first resistance value of said first resistance, that is connectable between said corresponding tremble detector and said capacitor;

wherein each of said removing system controllers comprises a first switch system by which said corresponding tremble detector and said capacitor are connected in series; and wherein said cut-off-frequency changing system comprises a second switch system that connects said first resistance between said corresponding tremble detector and said capacitor, and a third switch system that connects said second resistance between said corresponding tremble detector and said capacitor.

10. The camera of claim 9, wherein in said second signal line, said first resistance and said capacitor are connected in series;

said second resistance and said capacitor are connected in series;

said first switch system, said second switch system and said first resistance, and said third switch system and said second resistance are connected in parallel; and wherein immediately after an electric power is supplied to said camera, only said first switch system is closed;

during a photometry operation, only second switch system is closed; and while said image capturing operation is carried out, only third switch system is closed.

* * * * *